(12) United States Patent
Chandhoke et al.

(10) Patent No.: US 9,246,852 B2
(45) Date of Patent: Jan. 26, 2016

(54) LOSSLESS TIME BASED DATA ACQUISITION AND CONTROL IN A DISTRIBUTED SYSTEM

(71) Applicant: NATIONAL INSTRUMENTS CORPORATION, Austin, TX (US)

(72) Inventors: Sundeep Chandhoke, Austin, TX (US); Brian Keith Odom, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 263 days.

(21) Appl. No.: 14/072,297

(22) Filed: Nov. 5, 2013

(65) Prior Publication Data
US 2015/0124842 A1     May 7, 2015

(51) Int. Cl.
*H04L 12/861*   (2013.01)
*H04L 12/28*    (2006.01)
*H04Q 9/00*     (2006.01)
*H04L 7/00*     (2006.01)
*H04L 12/40*    (2006.01)

(52) U.S. Cl.
CPC ........ *H04L 49/9094* (2013.01); *H04L 12/2825* (2013.01); *H04Q 9/00* (2013.01); *H04L 7/0008* (2013.01); *H04L 12/40058* (2013.01)

(58) Field of Classification Search
None
See application file for complete search history.

(56) References Cited

U.S. PATENT DOCUMENTS

| 6,085,270 | A | 7/2000 | Gulick | |
|---|---|---|---|---|
| 6,404,770 | B1* | 6/2002 | Fujimori | H04L 12/40052 370/389 |
| 6,408,351 | B1 | 6/2002 | Hamdi et al. | |
| 6,754,755 | B1* | 6/2004 | Johnson | G06F 13/102 709/223 |
| 2014/0334553 | A1* | 11/2014 | Novotny | H04N 19/115 375/240.26 |

OTHER PUBLICATIONS

International Search Report for Application No. PCT/US2014/060314, mailed Feb. 17, 2015; 4 pages.

* cited by examiner

*Primary Examiner* — Habte Mered
(74) *Attorney, Agent, or Firm* — Meyertons Hood Kivlin Kowert & Goetzel, P.C.; Jeffrey C. Hood; Brian E. Moore

(57) ABSTRACT

Systems and methods for mapping an iterative time-based data acquisition (DAQ) operation to an isochronous data transfer channel of a network. A time-sensitive buffer (TSB) associated with the isochronous data transfer channel of the network may be configured. A data rate clock may and a local buffer may be configured. A functional unit may be configured to initiate continuous performance of the iterative time-based DAQ operation, transfer data to the local buffer, initiate transfer of the data between the local buffer and the TSB at a configured start time, and repeat the transferring and initiating transfer in an iterative manner, thereby transferring data between the local buffer and the TSB. The TSB may be configured to communicate data over the isochronous data transfer channel of the network, thereby mapping the iterative time-based DAQ operation to the isochronous data transfer channel of the network.

24 Claims, 6 Drawing Sheets

LOSSLESS TIME BASED DATA ACQUISITION AND CONTROL IN A DISTRIBUTED SYSTEM

FIELD OF THE INVENTION

The present invention relates to the field of isochronous data transfer, and more particularly to a system and method for a time-based waveform acquisition engine.

DESCRIPTION OF THE RELATED ART

Time based, or isochronous, data transfer is used by control applications in which timely transfer of a data stream, or buffer, is of utmost importance. If for any reason the data arrives late it cannot be used and is discarded. Accordingly, control based applications are typically designed to tolerate some loss or late arrival of data. For example, in some control based applications, if data for one control period are lost, they can detect this and defer the control loop calculation until the next period. Additionally, if data continued to arrive late or did not arrive at all for multiple control loops, the control based application could flag an error and take more severe actions.

Furthermore, networks and processor interconnects have implemented features specific to the support of isochronous data transfer for control based applications. For example, features in standards such as PCI Express and time-sensitive (TS) networking incorporate support for isochronous data transfer. These features incorporate the two fundamental requirements necessary to support isochronous data transfer—first, the requirement that there is synchronization between endpoints participating in isochronous data transfer, thus guaranteeing the coordinated transmission and reception of data; and second, the requirement that there is reserved bandwidth all the way from the producer of the data to the consumer of the data, thus guaranteeing the delivery and the synchronization of endpoints.

There are new advances in applications that may benefit from these fundamental requirements of isochronous data transfer. For example, the so-called "Internet of Things" is expanding Internet connectivity to machines in a broad range of fields from power systems to medical devices. In such applications, the most common usage of data is aggregation for analysis or logging. Furthermore, since measurement nodes that acquire data in these applications are typically distributed over wide geographical areas, conventional signal based synchronization techniques cannot be applied. Instead, time is used to synchronize measurements and data are acquired either via a finite acquisition or a continuous acquisition.

In a finite acquisition, a set of data points is acquired at periodic intervals, e.g., a set of data points per interval. Each interval is synchronized in phase and frequency amongst all nodes in a system. Examples of such systems include Power Phasor Measurement Units as well as structural and machine monitoring systems.

In a continuous acquisition, data are continuously acquired once the acquisition has been started. The start time, t0, and the time between acquisitions, $\Delta t$, are synchronized amongst all nodes in a system. Additionally, the acquisition generally terminates only when a command explicitly terminating the acquisition is received. An example of such a system is an in-vehicle data logger.

In such time-based data acquisition systems, since data are aggregated, applications may tolerate late arrival of data but not loss. Hence, currently data transferred in these systems are treated either independently of isochronous data, e.g., transferred as best effort or asynchronous data, or aggregated at the endpoints by transmitting one data point at a time using an isochronous channel. Treatment of the data as independent of isochronous data addresses the lossless requirement by acknowledging the data transfer and re-transmitting it in case of loss. Use of an isochronous channel uses the reserved bandwidth on the isochronous channel to eliminate loss due to congestion, but does not handle the case for loss due to electromagnetic interference (EMI) or data corruption due to bit errors on the network or bus. Additionally, in prior approaches, aggregation at the endpoints and use of the isochronous channel can only be mapped to finite acquisition and cannot address the continuous acquisition model. Thus, improvements in data transfer in such systems are sought.

For example, improvements in the timely delivery of time based measurements would provide multiple benefits. First, timely delivery may reduce aggregation latency, thereby improving processing efficiency. Additionally, timely delivery may improve monitoring cycle time, allowing real-time analysis and data set reduction, from a storage prospective, and allow for faster response times. Timely delivery may also increase network bandwidth utilization by reducing delays due to retransmission and congestion and improve coexistence with control systems without introducing jitter. Further, timely delivery may allow for the introduction of new control models where algorithms may use coherent sets of aggregated waveforms as inputs to compute control outputs. Finally, timely delivery may reduce and simplify memory management allowing for precise pre-runtime allocation to match acquisition rate using data transfer rate. Since there are a multitude of advantages to improving the timely delivery of time based measurements, the current application describes various embodiments of a way of mapping time-based data acquisitions into an isochronous data transfer channel.

SUMMARY OF THE INVENTION

Various embodiments of a system and method for configuring the mapping of an iterative time-based data acquisition (DAQ) operation to an isochronous data transfer channel of a network are presented below.

In one embodiment, a system for mapping an iterative time-based DAQ operation to an isochronous data transfer channel of a network may include a functional unit, a data rate clock, a local buffer, and a time-sensitive buffer (TSB). The iterative time-based DAQ operation may include an associated data transfer per iteration and a block of data may include data transferred by one or more of the associated data transfers. The data rate clock may be coupled to the functional unit and may be configured to synchronize to a global clock of the network. Additionally, the local buffer and the TSB may be coupled to the functional unit and the TSB may include a configurable buffer size for the iterative time-based DAQ operation and a configurable transfer frequency. The TSB may be associated with the isochronous data transfer channel of the network.

In various embodiments, the system may implement or perform a method for configuring the mapping of an iterative time-based DAQ operation to an isochronous data transfer channel of a network. In one embodiment of the method, a buffer size of a TSB for the iterative time-based DAQ operation and a transfer frequency of the TSB may be configured. Further, a data rate clock may be configured to synchronize to a global clock of the network and a start time for transferring one or more blocks of data to the TSB may be configured. In some embodiments, the start time for transferring one or more blocks of data may be based on the buffer size of the TSB.

Additionally, the start time for transferring one or more blocks of data may be based on a start time and data rate of the iterative time-based DAQ operation. In certain embodiments, the data rate may be in accordance with the data rate clock and the start time of the iterative time-based DAQ operation may be in phase with the global clock of the network. Further, the start time for transferring one or more blocks of data may be based on the size of a block of the data transferred.

Additionally the method may include configuring a size of a local buffer. In some embodiments, the size of the local buffer may be based on the size of the block of the data transferred and the data rate of the iterative time-based DAQ operation. Additionally, the size of the local buffer may be based on the transfer frequency of the TSB. Also, in one embodiment, the local buffer may be configured for transfer of the one or more blocks of data to the local buffer in response to the continuous performance of the iterative time-based DAQ operation.

Further, the method may include configuring a functional unit to initiate the continuous performance of the iterative time-based DAQ operation at the start time of the iterative time-based DAQ operation and transfer the one or more blocks of data to the local buffer in response to the continuous performance of the iterative time-based DAQ operation. Accordingly, the functional unit may be configured to initiate transfer of the one or more blocks of data between the local buffer and the TSB at the start time for transferring the one or more blocks of data. In certain embodiments, transferring of the one or more blocks of data between the local buffer and the TSB may include the functional unit performing a data integrity process during the transfer. The data integrity process may prevent data loss. In one embodiment, the data integrity process may include embedding forward error correction code.

In an exemplary embodiment, the functional unit may be configured to repeat the transferring (to the local buffer) and initiating transfer (from the local buffer to the TSB) one or more times in an iterative manner, transferring the one or more blocks of data between the local buffer and the TSB. Thus, the TSB may be configured to communicate the one or more blocks of data over the isochronous data transfer channel of the network over at least one cycle of the TSB and at the transfer frequency of the TSB. Hence, the iterative time-based DAQ operation may be mapped to the isochronous data transfer channel of the network.

In some embodiments of the method, the functional unit may initiate the continuous performance of the iterative time-based DAQ operation at the start time of the iterative time-based DAQ operation. Further, the functional unit may transfer the one or more blocks of data to the local buffer in response to the continuous performance of the iterative time-based DAQ operation and may initiate transfer of the one or more blocks of data between the local buffer and the TSB at the start time for transferring the one or more blocks of data. Further, the functional unit may repeat the transferring (to the local buffer) and initiating transfer (from the local buffer to the TSB) one or more times in an iterative manner, and thus transfer the one or more blocks of data between the local buffer and the TSB. Accordingly, the one or more blocks of data may be communicated over the isochronous data transfer channel of the network over at least one cycle at the transfer frequency of the TSB.

In one embodiment of the method, the functional unit may also be configured to configure the buffer size and transfer frequency of the TSB. Additionally, in certain embodiments, the functional unit may be configured to configure the data rate clock and the start time for transferring the one or more blocks of data between the local buffer and the TSB. Further, the functional unit may be configured to configure the size of the local buffer and to configure the local buffer for transferring the one or more blocks of data.

In another embodiment of the method, another functional unit or a computer system may be configured to configure the buffer size and transfer frequency of the TSB. Additionally, in certain embodiments, the other functional unit or computer system may be configured to configure the data rate clock and the start time for transferring the one or more blocks of data between the local buffer and the TSB. Further, the other functional unit or computer system may be configured to configure the size of the local buffer and to configure the local buffer for transferring the one or more blocks of data.

In yet another embodiment of the method, a plurality of iterative time-based DAQ operations may be configured. In such embodiments, the plurality of iterative time-based DAQ operations may include the iterative time-based DAQ operation and one or more additional iterative time-based DAQ operations. Hence, for each of the one or more additional iterative time-based DAQ operations, a start time, a data rate clock and a size of a local buffer may be configured. Accordingly, each local buffer associated with each iterative time-based DAQ operation may be configured for transfer of the one or more blocks of data produced, or generated, by the iterative time-based DAQ operation associated with the local buffer. Thus, the plurality of iterative time-based DAQ operations may have a corresponding plurality of local buffers and data rate clocks.

In some embodiments that include a plurality of time-based DAQ operations, the functional unit may be configured to, for each of the plurality of iterative time-based DAQ operations, initiate continuous performance of the iterative time-based DAQ operation at a respective start time of the iterative time-based DAQ operation and transfer a respective one or more blocks of data to the respective local buffer in response to the continuous performance of the iterative time-based DAQ operation. Additionally, the functional unit may be configured to, for each of the plurality of iterative time-based DAQ operations, initiate transfer of the respective one or more blocks of data between the respective local buffer and the TSB at the start time for transferring the one or more blocks of data and repeat the transferring and the initiating transfer one or more times in an iterative manner, thereby transferring the one or more blocks of data from the respective local buffer to the TSB. Accordingly, in certain embodiments, the functional unit may, for each of the plurality of iterative time-based DAQ operations, perform the actions for which it is configured.

Further, in certain embodiments, the TSB may be configured to communicate the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network. Accordingly, in certain embodiments, the TSB may communicate the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network.

Additionally, in some embodiments that include the plurality of iterative time-based DAQ operations, the method may further include performing configuring buffer size and transfer frequency, and configuring a start time for transferring one or more blocks of data, for each of one or more additional TSBs. Additionally, each of the one or more additional TSBs may be associated with a corresponding functional unit of one or more additional functional units. Thus, the TSB and the additional one or more TSBs may compose a plurality of TSBs, and the functional unit and the one or more additional functional units may compose a plurality of functional units. Accordingly, the plurality of iterative time-based DAQ operations with the corresponding plurality of local buffers may be mapped to the plurality of TSBs. Hence, each of the plurality of TSBs may be configured to communicate a respective one or more blocks of data over a corresponding isochronous data transfer channel of the network at a respective transfer frequency of the respective TSB, thereby mapping the plurality of iterative time-based DAQ operations to a plurality of isochronous data transfer channels of the network.

Additionally, in such embodiments, for each respective TSB of the plurality of TSBs, a corresponding functional unit of the plurality of functional units may be configured to, for at least one iterative time-based DAQ operation of the plurality of iterative time-based DAQ operations, initiate continuous performance of the at least one iterative time-based DAQ operation at a respective start time of the at least one iterative time-based DAQ operation, transfer the respective one or more blocks of data to the respective local buffer in response to the continuous performance of the at least one iterative time-based DAQ operation, initiate transfer of the respective one or more blocks of data between the respective local buffer and the TSB at the start time for transferring the one or more blocks of data, and repeat transferring and initiating transfer one or more times in an iterative manner, thereby transferring the respective one or more blocks of data between the respective local buffer and the respective TSB.

Further, each of the plurality of TSBs may be configured to communicate the respective one or more blocks of data from each of the plurality of TSBs over a corresponding isochronous data transfer channel of the network at the respective transfer frequency of the respective TSB, thereby mapping the plurality of iterative time-based DAQ operations to a plurality of isochronous data transfer channels of the network. Accordingly, in certain embodiments, the method may further include, for each respective TSB of the plurality of TSBs, the corresponding functional unit of the plurality of functional units may perform, for at least one iterative time-based DAQ operation of the plurality of iterative time-based DAQ operations, the above actions for which it is configured.

In certain embodiments, the method may further include configuration and performance of an iterative time-based control operation. In such embodiments, the functional unit may be or include a first functional unit, the local buffer may be or include a first local buffer, the TSB may be or include a first TSB, the data rate clock may be or include a first data rate clock, and the isochronous data transfer channel may be or include a first isochronous data transfer channel. The method may further include configuring buffer size of a second TSB for the iterative time-based control operation. The iterative time-based control operation may include an associated data transfer per iteration and a block of data may include data transferred by one or more of the associated data transfers. Accordingly, the second TSB may be associated with a second isochronous data transfer channel of the network.

In addition, the method may further include configuring a transfer frequency of the second TSB and configuring a second data rate clock, associated with the iterative time-based control operation, to synchronize to the global clock of the network. Also, the method may include configuring a second start time for transferring one or more blocks of data from the second TSB. The second start time for transferring one or more blocks of data may be based on the buffer size of the second TSB, a start time of the iterative time-based control operation, a data rate of the iterative time-based control operation in accordance with the second data rate clock, and size of a block of the data transferred. In certain embodiments, the start time of the iterative time-based data operation may be in phase with the global clock of the network. Further, a size of a second local buffer may be configured and may be based on the size of the block of the data transferred, the transfer frequency of the second TSB, and the data rate of the iterative time-based control operation. The second local buffer may also be configured for transfer of the one or more blocks of data from the second local buffer in response to continuous performance of the time-based control operation.

Accordingly, a second functional unit may be configured to initiate the continuous performance of the iterative time-based control operation at the start time of the iterative time-based data operation, transfer the one or more blocks of data from the local buffer in response to the continuous performance of the time-based control operation, initiate transfer of the one or more blocks of data between the second local buffer and the second TSB at the second start time for transferring the one or more blocks of data, and repeat the transferring and initiating transfer one or more times in an iterative manner, thereby transferring the one or more blocks of data between the second local buffer and the second TSB. Hence, the second TSB may be configured to communicate the one or more blocks of data over a second isochronous data transfer channel of the network over at least one cycle at the transfer frequency of the second TSB, thereby mapping the iterative time-based control operation to the second isochronous data transfer channel of the network. In some embodiments, the second functional unit may perform the above actions for which it is configured.

In an exemplary embodiment which may include both an iterative time-based DAQ operation and an iterative time-based control operation, the functional unit may include the first functional unit and the second functional unit, and the TSB may include the first TSB and the second TSB. Accordingly, the isochronous data transfer channel may include the first isochronous data transfer channel and the second isochronous data transfer channel of the network.

Thus, the system and method may operate to perform both iterative time-based data acquisition operations and iterative time-based control operations using embodiments of the techniques disclosed herein.

BRIEF DESCRIPTION OF THE DRAWINGS

A better understanding of the present invention can be obtained when the following detailed description of the preferred embodiment is considered in conjunction with the following drawings, in which.

Figure 1:
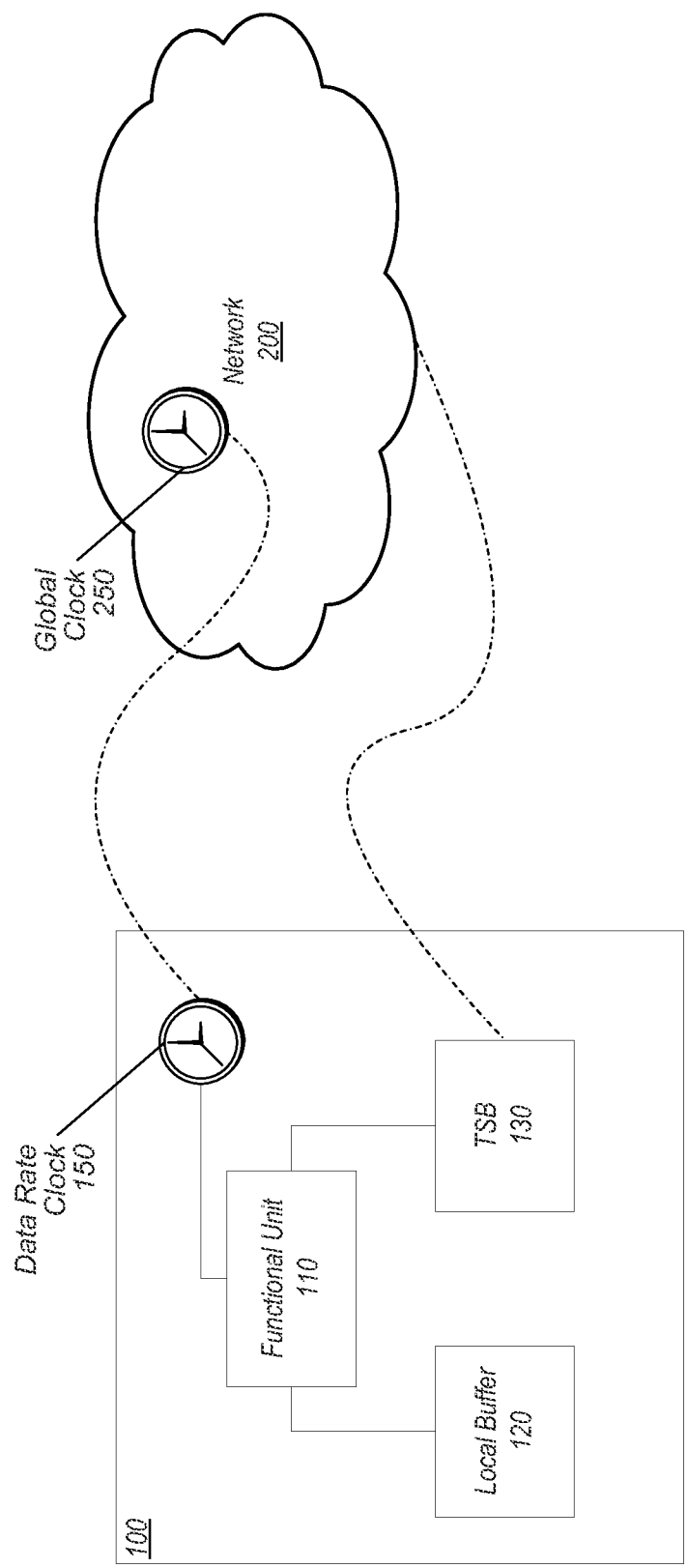
FIG. 1 illustrates a system configured to map an iterative time-based DAQ operation to an isochronous data transfer channel of a network according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following reference is hereby incorporated by reference in its entirety as though fully and completely set forth herein:

U.S. patent application Ser. No. 13/244,572 titled "Configuring Buffers with Timing Information," filed on Sep. 25, 2011.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Lossless—refers to a class of data compression algorithms allowing reconstruction of the exact original data from compressed data.

Forward Error Correction (FEC)—refers to a technique for controlling errors in data transmission in which redundancy in the sender message prevents data loss due to bit errors and network reconfiguration.

Finite Acquisition—refers to an acquisition in which a set of data points is acquired at periodic intervals. Each interval is synchronized in phase and frequency amongst all nodes in a system.

Continuous Acquisition—refers to an acquisition in which data are continuously acquired once the acquisition has been started. The start time, $t_0$, and the time between acquisitions, $\Delta t$, are synchronized amongst all nodes in a system. Additionally, the acquisition may terminate only when a command explicitly terminating the acquisition is received Internet Protocol (IP)—refers to the networking model and a set of protocols for communication used for networks such as the Internet.

Transmission Control Protocol (TCP)—refers to a core protocol of the internet protocol suite and provides delivery of a stream of octets between programs running on computers connected to a local area network, intranet, or the public Internet.

Ethernet—refers to a family of computer networking technologies for local area networks (LANs) as standardized in IEEE 802.3.

Non-Time-Sensitive (NTS) Network—refers to a real-time Ethernet network implementation such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, Ethernet Powerlink, which is a deterministic real-time protocol for standard Ethernet, among others.

Local Area Network (LAN)—refers to a computer network that interconnects computers in a limited geographical area such as an office building or office complex.

Virtual Local Area Network (VLAN)—refers to a computer network that is logically segmented on an organizational basis, in other words, segmentation is based on functions or applications rather than on a physical or geographic basis as is the case with LANs.

Media Access Control (MAC) Layer—refers to the sublayer of a multi-layer computer network model which provides addressing and channel access control mechanisms that enable communication between multiple network nodes that share a common medium, such as Ethernet. MAC layer acts as an interface between the logical link control sub-layer and the network's physical (PHY) layer.

Time-Sensitive (TS) Network—refers to networks adhering to the IEEE 802.1 standard for real-time data transfer.

Time-Sensitive (TS) Packet—refers to specific packets of data routed through a TS network that contain time-sensitive data. May include packets from an NTS network with a VLAN tag inserted using embodiments of the present techniques.

Isochronous—refers generally to events that occur regularly, or in other words, at equal time intervals.

Asynchronous—refers generally to events that occur irregularly, or in other words, at unscheduled and intermittent time intervals.

Figure 2:
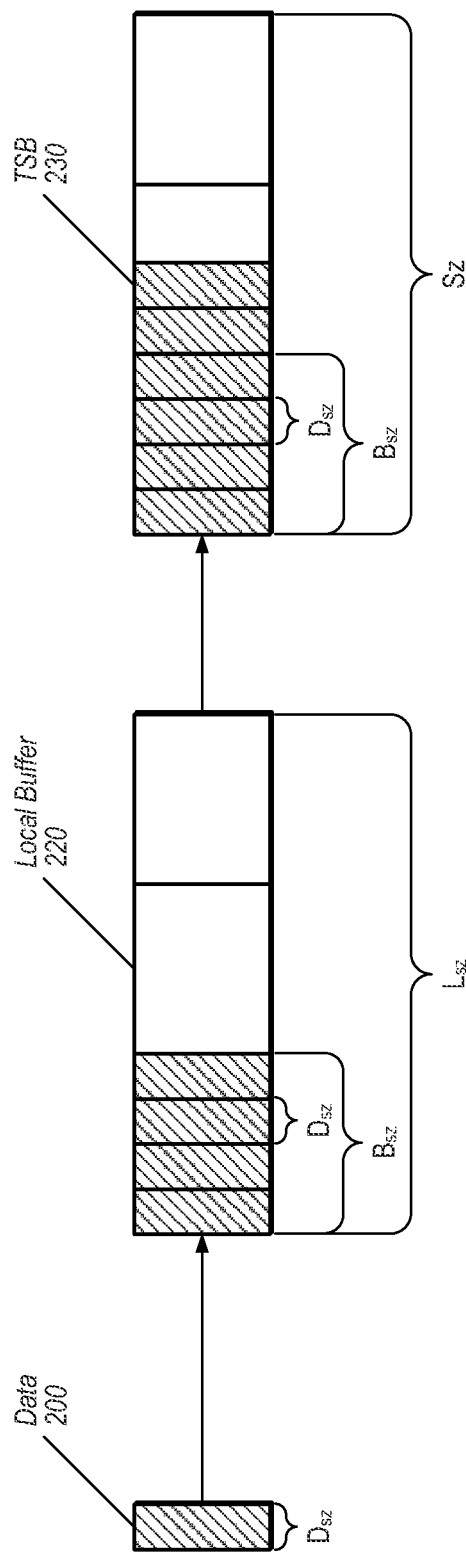
FIG. 2 illustrates a mapping of iterative time-based DAQ to a time-sensitive buffer according to one embodiment.
Figure 3:
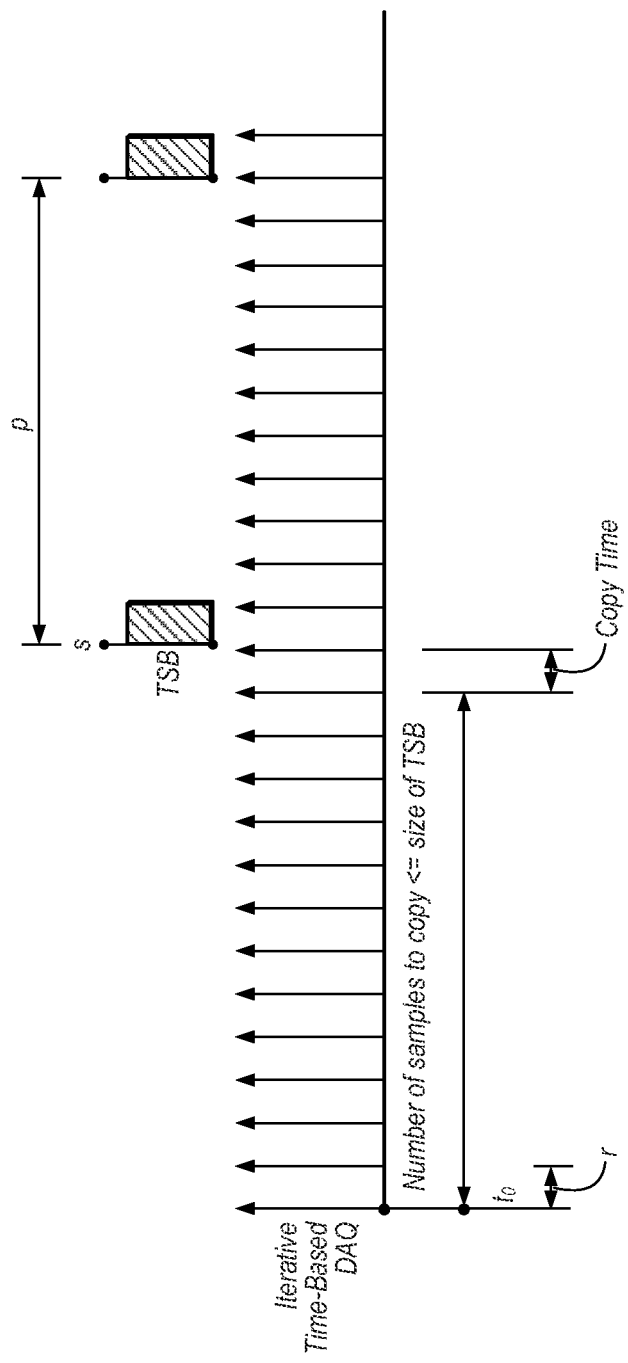
FIG. 3 illustrates an exemplary timeline of a time-sensitive buffer according to one embodiment.

FIGS. 1-4: Systems and Methods for Mapping Time-Based Data to an Isochronous Data Transfer Channel FIG. 1 illustrates a system configured to map an iterative time-based DAQ operation to an isochronous data transfer channel of a network according to an embodiment of the present invention. FIGS. 2 and 3 illustrate mapping the data associated with the iterative time-based DAQ operation to a time-sensitive buffer (TSB) and the transfer of the data from the TSB over time, respectively. Additionally, one embodiment of a method for configuring the mapping of an iterative time-based DAQ operation to an isochronous data transfer channel of a network is described below in reference to FIG. 4.

As shown in FIG. 1, the system 100 may include a functional unit 110, a local buffer 120, a time-sensitive buffer (TSB) 130, and a data rate clock 150. In certain embodiments, as further described below, the system 100 may be included in, or coupled to, a network interface controller (NIC). Additionally, in some embodiments, the system 100 may be coupled to, or included in a measurement device, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, or other similar types of devices.

Accordingly, in one embodiment, the system may be included in a NIC coupled to, or included in, a measurement device. Further, the measurement device may be a distributed measurement device, e.g., part of a network, such as a time-sensitive (TS) network, adhering to the IEEE 802.1 standard for real-time data transfer, or a non-time-sensitive (NTS) network, e.g., a real-time Ethernet network implementation such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. Alternatively, the system may be included in a memory-mapped distributed system, such as peripheral component interconnect (PCI), PCI express (PCIe), or CompactPCI, among others. Examples of such systems include, among others, systems based on National Instruments Corporation's CompactRIO platform and systems based on National Instruments Corporation's PXI platform.

In one embodiment, the functional unit 110 may be coupled to the local buffer 120, the TSB 130, and the data rate clock 150. Note that, in certain embodiments, the system 100 may include one or more functional units, however, for simplicity, the functionality of the system 100 is described in terms of a single functional unit. Also note that the term functional unit may be used interchangeably with the term processing element and is meant in its broadest sense. In other words, the term functional unit, or processing element, refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

In an exemplary embodiment, the data rate clock 150 may be configured to synchronize to a global clock of a network, such as global clock 250 of network 200. In various embodiments, the system 100 may be included in or coupled to the network 200 via an Ethernet type connection, or alternatively, via a memory mapped bus, such as PCI, PCIe, or Compact-PCI. Further, note that data rate clock 150 may be one of multiple data rate clocks included in system 100, e.g., data rate clock 150 may be one of a plurality of data rate clocks, each of which may be configured to synchronize to a global clock of a network, either directly or indirectly, e.g., via another clock synchronized to the global clock.

Each iteration of the iterative time-based DAQ operation may produce, or generate, data and may have an associated data transfer. In other words, the iterative time-based DAQ operation may include an associated data transfer per iteration. Further, in an exemplary embodiment further described below, the system may include both iterative time-based DAQ acquisition and iterative time-based control operation.

In various embodiments, a block of data may be transferred by an associated data transfer or by multiple associated data transfers. Thus, transferring a block of data may include one or more data transfers. The amount, or quantity, of data included in an associated data transfer may be configured as may the number, or quantity, of data transfers included in a block of data. In other words, the size of a block of the data to be transferred may be configured or otherwise specified. In addition, the iterative time-based DAQ operation may be specified, or configured, with a start time and a data rate. Note that the start time of the iterative time-based DAQ operation may be in phase with the global clock 250 of the network 200 and the data rate may be in accordance with the data rate clock 150, thus synchronized to, and in phase with, global clock 250. Note further that since the iterative time-based DAQ operation may be in phase and in sync with a global clock, multiple systems may be deployed over a network and may each be in phase and synchronized with each other via synchronization to the global clock.

Further, the TSB 130 may include a configurable buffer size and transfer frequency. Accordingly, a start time for transferring a block(s), e.g., one or more blocks, of data to the TSB 130 may be configured. In one embodiment, the start time for transferring the block(s) of data may be configured based on the start time and data rate of the iterative time-based DAQ operation and the size of a block of the data to be transferred. In addition, the TSB may be associated with the isochronous data transfer channel of the network 200.

Additionally, the size of the local buffer 120 may be configured. In one embodiment, the size of the local buffer 120 may be configured based on the size of the block of the data transferred, the transfer frequency of the TSB, and the data rate of the iterative time-based DAQ operation. Thus, the size of the local buffer 120 may be dependent on the both the configuration of the TSB and the configuration of the iterative time-based DAQ operation, as described in more detail in reference to FIGS. 2 and 3, described below. Further, the local buffer 120 may be configured for transfer of one or more blocks of data in response to the continuous performance of the iterative time-based DAQ operation.

In one embodiment, the functional unit 110 may be configured to initiate the continuous performance of the iterative time-based DAQ operation at the start time of the iterative time-based DAQ operation. In some embodiments, the functional unit 110 may receive a trigger indicating the start time of the iterative time-based DAQ operation. In other embodiments, the functional unit 110 may be configured to schedule the start time in accordance to a schedule provided to the functional unit 110.

The continuous performance of the iterative time-based DAQ operation may produce, or generate, data, and thus, the functional unit may be configured to transfer the one or more blocks of data to the local buffer in response to the production or generation of data. Further, the functional unit 110 may be configured to, at the start time for transferring the one or more blocks of data, initiate transfer of the one or more blocks of data between the local buffer 120 and the TSB 130. Accordingly, the functional unit 110 may be configured to repeat the transferring the one or more blocks of data to the local buffer and initiating transfer of the one or more blocks of data between the local buffer 120 and the TSB 130. In other words, the functional unit 110 may be configured to write data to the local buffer 120 and transfer data from the local buffer 120 to the TSB 130 in an iterative manner.

Note that the data may not be transferred linearly from the iterative time-based DAQ operation to the TSB. For example, in an embodiment, one or more blocks of data may accumulate in the local buffer prior to transfer to the TSB. However, the TSB may not immediately communicate the one or more blocks of data transferred from the local buffer. The TSB may accumulate additional one or more blocks of data prior to communicating the data over the isochronous data transfer channel. In other embodiments, the local buffer may accumulate one or more blocks of data and a subset of the one or more blocks of data may be transferred to the TSB and immediately communicated over the isochronous data transfer channel. In such embodiments, the size of the local buffer may be configured to prevent loss of data or the frequency of the TSB may be configured to prevent loss of data.

In an exemplary embodiment, the functional unit 110 may be further configured to perform a data integrity process which may prevent data loss during the transfer of the one or more blocks of data between the local buffer 120 and the TSB 130. Accordingly, in one embodiment, the data integrity process may include a lossless algorithm, e.g., a data compression algorithm allowing reconstruction of the exact original data from compressed data. For example, the data integrity process may include embedding forward error correction code (FEC), a technique for controlling errors in data transmission in which redundancy in the sender message prevents data loss due to bit errors and network reconfiguration. Additionally, the data integrity process may include other types of error correction algorithms, such as Reed Solomon, Hamming Codes, Viterbi, Erasure Coding, and Application-Level Forward Erasure Correction, among others.

In certain embodiments, the TSB 130 may be configured to communicate the one or more blocks of data over the isochronous data transfer channel of the network 200 over a cycle of the TSB 130 at the transfer frequency of the TSB 130. Thus, the iterative time-based DAQ operation may be mapped to the isochronous data transfer channel of the network 200.

FIG. 2 is an illustration of a mapping of iterative time-based DAQ operation to a time-sensitive buffer according to one embodiment. As illustrated in FIG. 2, an iteration of the iterative time-based DAQ operation may include a data transfer of data 200, which may include an associated data transfer size, $D_{sz}$. Thus, each iteration, a transfer of data 200 to local buffer 220 may occur. Note that local buffer 220 may have similar or the same functionality as local buffer 120.

Local buffer 220 may include an associated block size, $B_{sz}$, where the block size may be a multiple of the data transfer size, $D_{sz}$. Accordingly, transferring a block of data may include one or more data transfers. In other words, a block of data may include data from multiple (one or more) iterative time-based DAQ operation iterations. Additionally, local buffer 220 may have an associated size, $L_{sz}$, which may be greater than or equal to the block size, $B_{sz}$. Note, in some embodiments, the size of the local buffer may be equivalent to the data transfer size, $D_{sz}$. Further, in some embodiments, the size of the local buffer, $L_{sz}$, may be based on the size of the block, e.g., block size, $B_{sz}$, as well as the output frequency of TSB 230 and the data rate of the iterative time-based DAQ operation.

Once data 200 has been transferred to local buffer 220, it may then be transferred to TSB 230. In some embodiments, FEC may be embedded in the data to increase resilience of the data such that re-transmission is not required. FEC is known to prevent data loss due to bit errors, EMI and network reconfiguration. Note that data 200 may be transferred from local buffer 220 to TSB 230 as one or more blocks of data. The size, Sz, of TSB 230 may be configured along with a transfer frequency by a user, a functional unit coupled to the local buffer, a functional unit coupled to TSB 230, either locally or otherwise, or a computer system coupled to TSB 230, either locally or otherwise. Once data 200 has been transferred to TSB 230, TSB 230 may provide data 200, which may be included in one of the one or more blocks of data, over an isochronous data transfer channel of a network. The term network is meant to broadly include any of an Ethernet network, a TS network, an NTS network, or a memory-mapped bus, among others. Thus, since the isochronous channel may provide guaranteed delivery and FEC may remove the possibility of data loss due to bit errors, EMI, and network reconfiguration, data 200 may be provided over the network in a lossless manner.

FIG. 3 illustrates an exemplary timeline of a TSB according to one embodiment of the invention. In such an embodiment, at the start time of an iterative time-based DAQ operation, $t_0$, data may be produced or generated at a data rate, r, as indicated by each upward arrow and written, or copied, into a local buffer, such as local buffer 120 described above in reference to FIG. 1. In other words, each iteration of the time-based DAQ operation may include an associated data transfer which may produce or generate data, such as data 200 described above in reference to FIG. 2. The start time, s, of the TSB may be calculated using $t_S$, the start time of the iterative time-based DAQ operation, the size of the TSB, Sz, the size of the data, $D_{sz}$, acquired each iteration of the iterative time-based DAQ, and r, the data rate. Note that "copy time" may indicate the time necessary to transfer data from the local buffer to the TSB every period, p, of the TSB. Note further, that the TSB may be configured to transfer data, e.g., one or more blocks of data, periodically, e.g., at a transfer frequency. Thus, in certain embodiments, the start time, s, of the TSB may be represented mathematically by equation 1.

$$s = t_0 + (Sz \cdot r)D_{sz} + \text{Copy Time} \quad (1)$$

Further, the TSB may be configured with a combination of size and frequency to ensure that the local buffer may always have data to output to the TSB at the configured transfer frequency. Also note that by increasing either the local buffer size or the size of the TSB, embodiments where the data rate and transfer frequency of the TSB are not integer multiples of one another may be accommodated. Additionally, in certain embodiments, the size of the data transferred to the TSB, e.g., the size of the one or more blocks of data transferred, or the data payload size, may be provided along with the data. Said another way, the TSB may transmit a packet of data equivalent to the size of the TSB when the TSB does not contain data equivalent to the size of the TSB. Thus the TSB may transmit a packet of data that includes empty, or filler, data. In such instances, the data payload size may be included in the packet of data transmitted so that the empty, or filler, data may be ignored by a consumer of the data transmitted by the TSB. In other words, where the data rate is not an integer multiple of the transfer frequency of the TSB, the size of the local buffer and TSB may be configured to allow for lossless data transfer and, in some embodiments, the data payload size may be included in the data transferred by the TSB. For example, in one embodiment, where the start time, s, of the TSB may be represented by equation 1, the size of the local buffer, $L_{sz}$, may be represented mathematically by equation 2.

$$L_{sz} = \frac{(Sz(p + \text{Copy Time}))}{r} \quad (2)$$

Alternatively, in certain embodiments, the size of the TSB, Sz, may be determined based on the size of the local buffer, $L_{sz}$, as represented mathematically by equation 3.

$$Sz = \frac{L_{sz} \cdot r}{(p + \text{Copy Time})} \quad (3)$$

Further, in yet another embodiment, the frequency, or period, p, of the TSB may be determined based on the size of both the local buffer, $L_{sz}$, and the size, Sz, of the TSB, as represented mathematically by equation 4.

$$p = \frac{L_{sz} \cdot r}{Sz} - \text{Copy Time} \quad (4)$$

Figure 4:
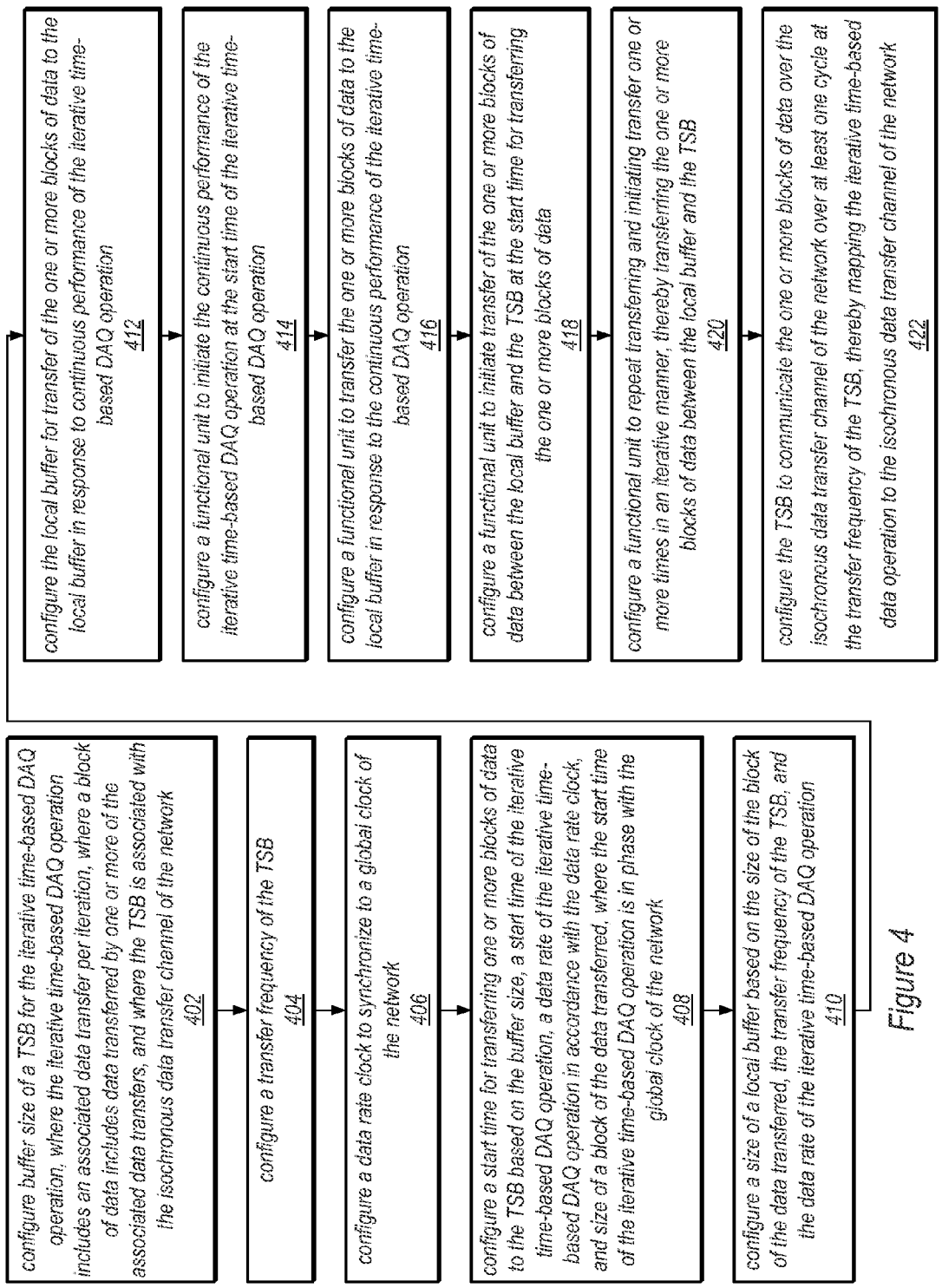
FIG. 4 is a flowchart diagram illustrating one embodiment of a method for configuring the mapping of an iterative time-based DAQ operation to an isochronous data transfer channel of a network.

FIG. 4 is a flowchart diagram illustrating one embodiment of a method for configuring the mapping of an iterative time-based DAQ operation to an isochronous data transfer channel of a network. The method shown in FIG. 4 may be used in conjunction with any of the systems or devices described above in reference to FIGS. 1-3, among other systems and devices. In various embodiments, some of the method elements shown may be performed concurrently, in a different order than shown, or may be omitted. Additional method elements may also be performed as desired. As shown, the method may operate as follows.

First, in 402 a buffer size of a TSB for the iterative time-based DAQ operation may be configured. Note, the TSB may be configured by a functional unit, such as functional unit 110, or the TSB may be configured by another functional unit or computer system coupled to the TSB, e.g., either via a memory mapped bus or a network connection, among other communicative couplings. As described above, the iterative time-based DAQ operation may include or cause an associated data transfer per iteration. Additionally, a block of data may include data transferred by one or more of the associated data transfers and the TSB may be associated with the isochronous data transfer channel of the network.

In 404, a transfer frequency of the TSB may be configured. Note that the transfer frequency may be the rate at which the TSB communicates data over the isochronous channel of the network. In certain embodiments, the rate may be specified as a period of the TSB, such as period, p, described above in reference to FIG. 3.

In 406, a data rate clock may be configured to synchronize to a global clock of the network. In some embodiments, the data rate clock may synchronize to the global clock via another data rate clock synchronized to the global clock. Thus, in certain embodiments, the data rate clock may be one of a plurality of data rate clocks. In such embodiments, a first data rate clock may be synchronized to the global clock and each additional data rate clock of the plurality of data rate clocks may synchronize to the global clock via the first data rate clock. In other embodiments, the data rate clock may synchronize to a local clock and the local clock may synchronize to the global clock.

In 408, a start time for transferring one or more blocks of data to the TSB may be configured. In some embodiments, the start time may be based on the buffer size of the TSB. Additionally, the start time may be based on a start time and data rate of the iterative time-based DAQ operation. The data rate may be in accordance with the data rate clock. The start time of the iterative time-based DAQ operation may be in phase with the global clock of the network. Further, the start time may be based on the size of a block of the data transferred.

In 410, a size of a local buffer may be configured. The size of the local buffer may be based on the size of the block of the data transferred and the data rate of the iterative time-based DAQ operation. Additionally, in some embodiments, the size of the local buffer may be further based on the transfer frequency of the TSB. Further, in a particular embodiment, the size of the local buffer may be further based on a copy time, e.g., the amount of time required to read the one or more blocks of data from the local buffer and write the one or more blocks of data to the TSB.

In 412, the local buffer may be configured for transfer of the one or more blocks of data to the local buffer in response to the continuous performance of the iterative time-based DAQ operation. Thus, in certain embodiments, the local buffer may be configured to store data produced or generated via the iterative time-based DAQ operation. Further, in certain embodiments, the local buffer may be further configured as a first-in-first-out (FIFO) buffer.

In 414, a functional unit may be configured to initiate the continuous performance of the iterative time-based DAQ operation at the start time of the iterative time-based DAQ operation. Note, in certain embodiments, the functional unit may be configured by a user of the system. In other embodiments, the functional unit may be configured by another functional unit or computer system coupled to the functional unit. Additionally, in some embodiments, the start time of the iterative time-based DAQ operation may be received by the functional unit as a trigger indicating the start time of the iterative time-based DAQ operation. In other embodiments, the functional unit may be configured to schedule the start time in accordance to a schedule provided to the functional unit.

In 416, the functional unit may be configured to transfer the one or more blocks of data to the local buffer in response to the continuous performance of the iterative time-based DAQ operation. In certain embodiments, the functional unit may be configured to write the one or more blocks of data directly to the local buffer as it is produced or generated by the iterative time-based DAQ operation. In other embodiments, the functional unit may be configured to temporarily buffer the one or more blocks of data prior to writing the one or more blocks of data to the local buffer.

In 418, the functional unit may be configured to initiate transfer of the one or more blocks of data between the local buffer and the TSB at the start time for transferring the one or more blocks of data. In certain embodiments, transferring of the one or more blocks of data between the local buffer and the TSB may include the functional unit performing a data integrity process during the transfer. The data integrity process may prevent data loss. In one embodiment, the data integrity process may include embedding forward error correction code.

In 420, the functional unit may be configured to repeat the transferring (to the local buffer) and initiating transfer (from the local buffer to the TSB) one or more times in an iterative manner, so transferring the one or more blocks of data between the local buffer and the TSB. In certain embodiments, the functional unit may be configured to transfer, e.g., copy from the local buffer and write to the TSB, the one or more blocks of data over a configured or determinable interval, e.g., a copy time. In such embodiments, the size of the local buffer and/or the size of the TSB may be based on the copy time.

In 422, the TSB may be configured to communicate the one or more blocks of data over the isochronous data transfer channel of the network over at least one cycle of the TSB and at the transfer frequency of the TSB. In other words, in some embodiments, the TSB may communicate all of the buffered data, e.g., the one or more blocks, currently stored in the TSB over a cycle of the TSB, whereas, in other embodiments, the TSB may communicate a portion of the buffered data over a cycle of the TSB so long as data is not overwritten in the TSB. Thus, the method may be implemented to map the iterative time-based DAQ operation to the isochronous data transfer channel of the network.

In certain embodiments of the method, the functional unit may initiate the continuous performance of the iterative time-based DAQ operation at the start time of the iterative time-based DAQ operation. Further, the functional unit may transfer the one or more blocks of data to the local buffer in response to the continuous performance of the iterative time-based DAQ operation and may initiate transfer of the one or more blocks of data between the local buffer and the TSB at the start time for transferring the one or more blocks of data. Further, the functional unit may repeat the transferring (to the local buffer) and initiating transfer (from the local buffer to the TSB) one or more times in an iterative manner and thus transfer the one or more blocks of data between the local buffer and the TSB. Accordingly, the one or more blocks of data may be communicated over the isochronous data transfer channel of the network over at least one cycle at the transfer frequency of the TSB.

In one embodiment of the method, the functional unit may also be configured to configure the buffer size and transfer frequency of the TSB. Additionally, in certain embodiments, the functional unit may be configured to configure the data rate clock and the start time for transferring the one or more blocks of data between the local buffer and the TSB. Further, the functional unit may be configured to configure the size of the local buffer and to configure the local buffer for transferring the one or more blocks of data.

In another embodiment of the method, another, or an additional, functional unit may be configured to configure the buffer size and transfer frequency of the TSB. Additionally, in certain embodiments, the additional functional unit may be configured to configure the data rate clock and the start time for transferring the one or more blocks of data between the local buffer and the TSB. Further, the additional functional unit may be configured to configure the size of the local buffer and to configure the local buffer for transferring the one or more blocks of data.

In yet another embodiment of the method, a plurality of iterative time-based DAQ operations may be configured. In such embodiments, the plurality of iterative time-based DAQ operations may include the iterative time-based DAQ operation and one or more additional iterative time-based DAQ operations. Hence, for each of the one or more additional iterative time-based DAQ operations, a start time, a data rate clock and a size of a local buffer may be configured. Accordingly, each local buffer associated with each iterative time-based DAQ operation may be configured for transfer of the one or more blocks of data produced, or generated, by the iterative time-based DAQ operation associated with the local buffer. Thus, the plurality of iterative time-based DAQ operations may have a corresponding plurality of local buffers and data rate clocks.

In some embodiments that include a plurality of time-based DAQ operations, the functional unit may be configured to, for each of the plurality of iterative time-based DAQ operations, initiate continuous performance of the iterative time-based DAQ operation at a respective start time of the iterative time-based DAQ operation and transfer a respective one or more blocks of data to the respective local buffer in response to the continuous performance of the iterative time-based DAQ operation. Additionally, the functional unit may be configured to, for each of the plurality of iterative time-based DAQ operations, initiate transfer of the respective one or more blocks of data between the respective local buffer and the TSB at the start time for transferring the one or more blocks of data and repeat the transferring and the initiating transfer one or more times in an iterative manner, thereby transferring the one or more blocks of data from the respective local buffer to the TSB. Accordingly, in certain embodiments, the functional unit may, for each of the plurality of iterative time-based DAQ operations, perform the actions for which it is configured.

Further, in certain embodiments, the TSB may be configured to communicate the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network. In other words, the plurality of local buffers may be multiplexed to a single TSB for communication over the isochronous data transfer channel of the network. Accordingly, in certain embodiments, the TSB may communicate the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network.

Additionally, in some embodiments that include the plurality of iterative time-based DAQ operations, the method may further include performing configuring buffer size and transfer frequency, and configuring a start time for transferring one or more blocks of data, for each of one or more additional TSBs. Additionally, each of the one or more additional TSBs may be associated with a corresponding functional unit of a one or more additional functional units. Thus, the TSB and the additional one or more TSBs may compose a plurality of TSBs, and the functional unit and the one or more additional functional units may compose a plurality of functional units. Accordingly, the plurality of iterative time-based DAQ operations with the corresponding plurality of local buffers may be mapped to the plurality of TSBs. Hence, each of the plurality of TSBs may be configured to communicate a respective one or more blocks of data over a corresponding isochronous data transfer channel of the network at a respective transfer frequency of the respective TSB, thereby mapping the plurality of iterative time-based DAQ operations to a plurality of isochronous data transfer channels of the network.

Note that in some embodiments the mapping may be linear, e.g., one-to-one or non-linear. In other words, an iterative time-based DAQ operation may be mapped to a corresponding TSB, e.g., a linear or one-to-one mapping. Alternatively, the mapping may be non-linear, e.g., there may not be a corresponding TSB for each iterative time-based DAQ operation. For example, a first iterative time-based DAQ operation may be mapped to a first TSB whereas a second and third iterative time-based DAQ operation may be mapped to a second TSB, and so forth.

Additionally, in such embodiments, for each respective TSB of the plurality of TSBs, a corresponding functional unit of the plurality of functional units may be configured to, for at least one iterative time-based DAQ operation of the plurality of iterative time-based DAQ operations, initiate continuous performance of the at least one iterative time-based DAQ operation at a respective start time of the at least one iterative time-based DAQ operation, transfer the respective one or more blocks of data to the respective local buffer in response to the continuous performance of the at least one iterative time-based DAQ operation, initiate transfer of the respective one or more blocks of data between the respective local buffer and the TSB at the start time for transferring the one or more blocks of data, and repeat said transferring and said initiating transfer one or more times in an iterative manner, thereby transferring the respective one or more blocks of data between the respective local buffer and the respective TSB. Further, each of the plurality of TSBs may be configured to communicate the respective one or more blocks of data from each of the plurality of TSBs over a corresponding isochronous data transfer channel of the network at the respective transfer frequency of the respective TSB, thereby mapping the plurality of iterative time-based DAQ operations to a plurality of isochronous data transfer channels of the network. Accordingly, in certain embodiments, the method may further include, for each respective TSB of the plurality of TSBs, the corresponding functional unit of the plurality of functional units may perform, for at least one iterative time-based DAQ operation of the plurality of iterative time-based DAQ operations, the above actions for which it is configured.

In certain embodiments, the method may further include configuration and performance of an iterative time-based control operation. In such embodiments, the functional unit may include a first functional unit, the local buffer may include a first local buffer, the TSB may be or include a first TSB, the data rate clock may be or include a first data rate clock, and the isochronous data transfer channel may be or include a first isochronous data transfer channel. The method may further include configuring buffer size of a second TSB for the iterative time-based control operation. Note, the iterative time-based control operation, similar to the iterative time-based DAQ operation, may include an associated data transfer per iteration and a block of data may include data transferred by one or more of the associated data transfers. Accordingly, the second TSB may be associated with a second isochronous data transfer channel of the network.

In addition, the method may further include configuring a transfer frequency of the second TSB and configuring a second data rate clock, associated with the iterative time-based control operation, to synchronize to the global clock of the network. Also, the method may include configuring a second start time for transferring one or more blocks of data from the second TSB. The second start time for transferring one or more blocks of data may be based on the buffer size of the second TSB, a start time of the iterative time-based control operation, a data rate of the iterative time-based control operation in accordance with the second data rate clock, and size of a block of the data transferred. In certain embodiments, the start time of the iterative time-based data operation may be in phase with the global clock of the network. Further, a size of a second local buffer may be configured and may be based on the size of the block of the data transferred, the transfer frequency of the second TSB, and the data rate of the iterative time-based control operation. The second local buffer may also be configured for transfer of the one or more blocks of data from the second local buffer in response to continuous performance of the time-based control operation.

Accordingly, a second functional unit may be configured to initiate the continuous performance of the iterative time-based control operation at the start time of the iterative time-based data operation, transfer the one or more blocks of data from the local buffer in response to the continuous performance of the time-based control operation, initiate transfer of the one or more blocks of data between the second local buffer and the second TSB at the second start time for transferring the one or more blocks of data, and repeat the transferring and initiating transfer one or more times in an iterative manner, thereby transferring the one or more blocks of data between the second local buffer and the second TSB. Hence, the second TSB may be configured to communicate the one or more blocks of data over a second isochronous data transfer channel of the network over at least one cycle at the transfer frequency of the second TSB, thereby mapping the iterative time-based control operation to the second isochronous data transfer channel of the network. Note, that in some embodiments, the second functional unit may perform the above actions for which it is configured.

In an exemplary embodiment which may include both an iterative time-based DAQ operation and an iterative time-based control operation, the functional unit may be configured as both the first and second function unit and the TSB may be configured as both the first and second TSB. In other words, the method may be performed using a single functional unit and a single TSB. Thus, the functional unit may include the first functional unit and the second functional unit and the TSB may include the first TSB and the second TSB. Accordingly, a single isochronous data transfer channel may be configured as both the first and second isochronous data transfer channel. Thus, the isochronous data transfer channel may include the first isochronous data transfer channel and the second isochronous data transfer channel of the network.

Note, that in certain embodiments, the first TSB may be a first partition of the TSB and the second TSB may be a second partition of the TSB. Accordingly, the iterative time-based DAQ operation may be mapped to the first partition of the TSB and the iterative time-based control operation may be to the second partition of the TSB. In such embodiments, the buffer size and transfer frequency of the TSB may be configured to accommodate both operations.

Figure 5:
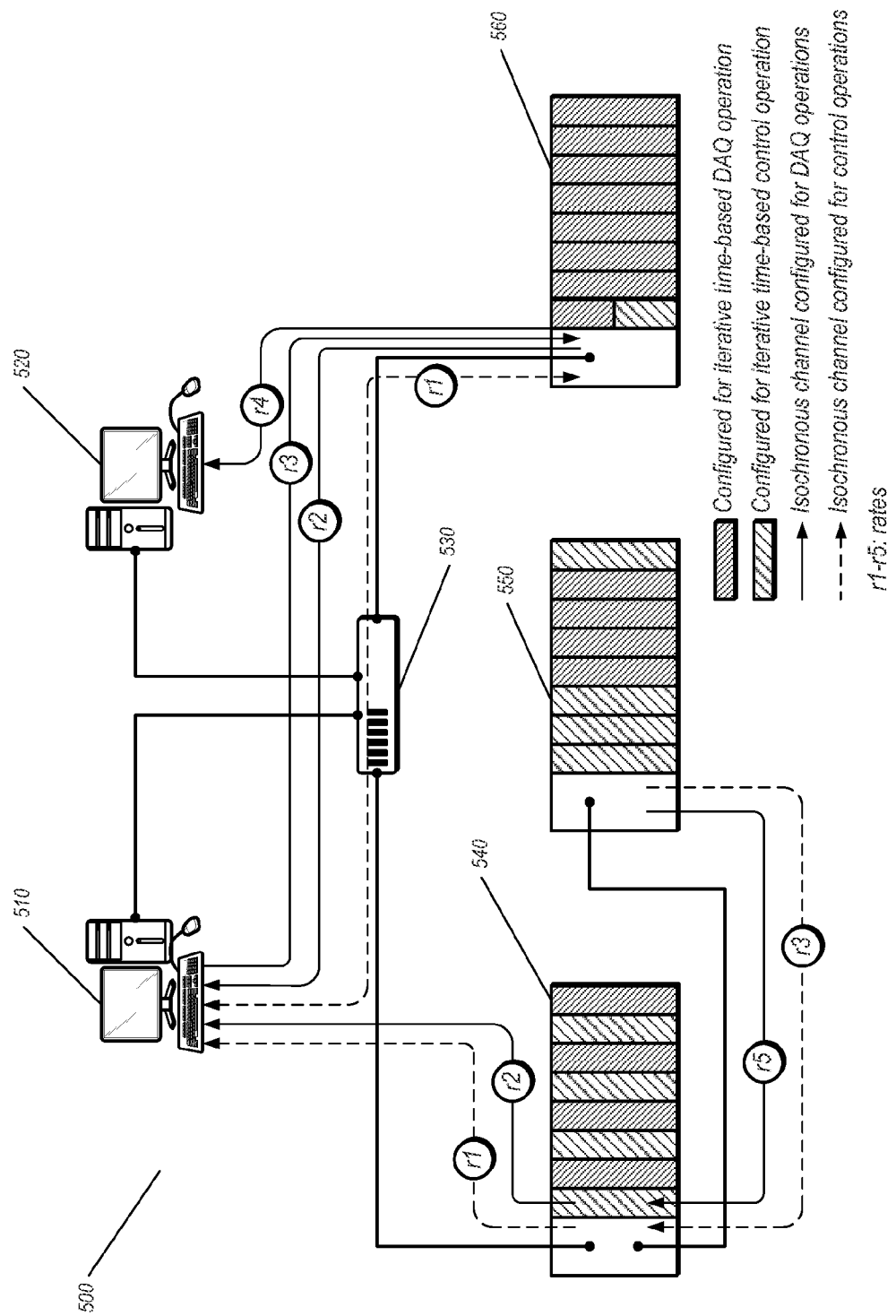
FIG. 5 illustrates a distributed measurement and control system according to one embodiment.
Figure 6:
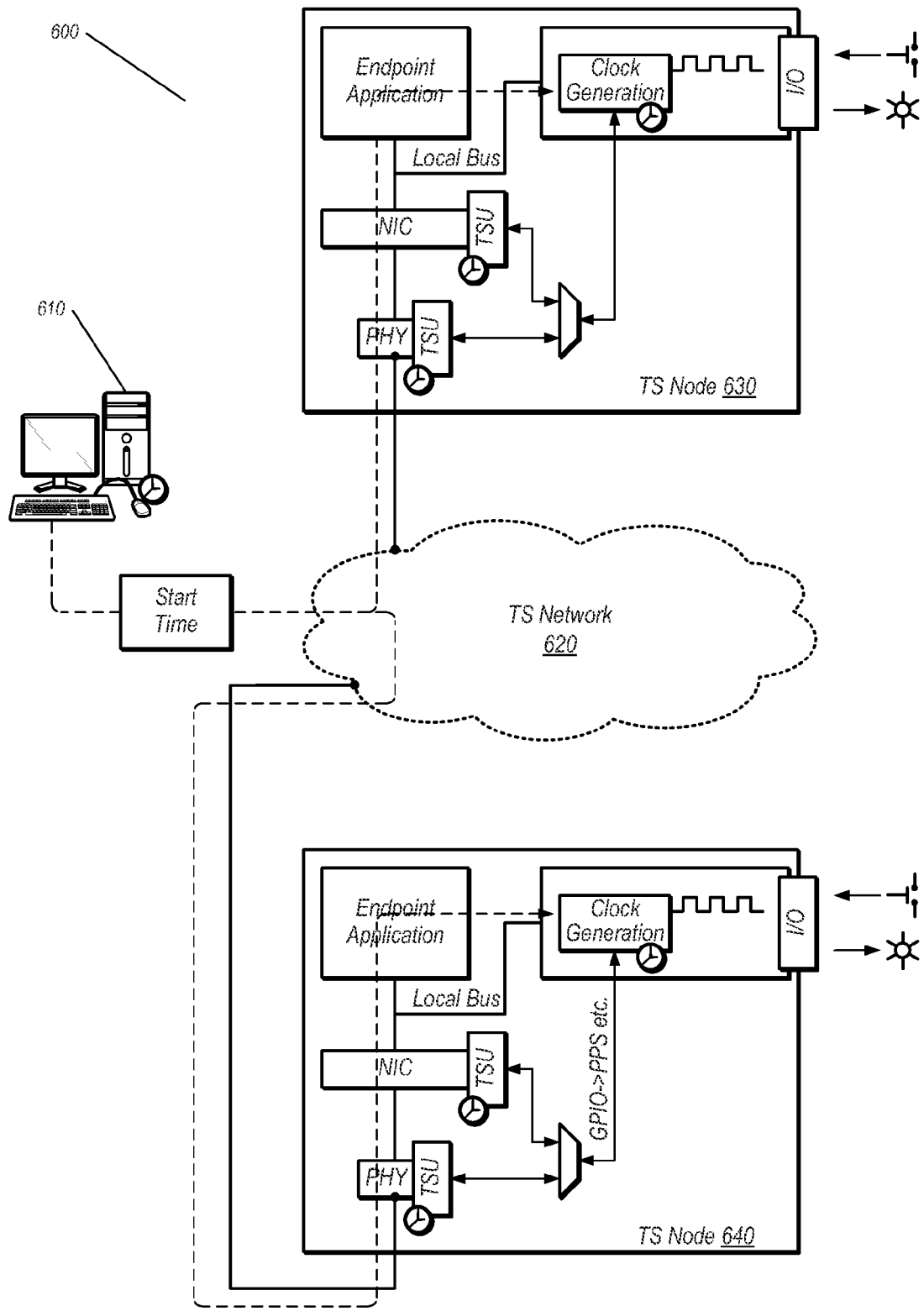
FIG. 6 illustrates another distributed measurement and control system according to one embodiment.

FIGS. 5-6: Further Embodiments of Distributed Control and Measurement Systems

FIGS. 5 and 6 illustrate further embodiments of the above described systems and methods. Note that these embodiments, although described in detail, are exemplary only and numerous variations and modifications will become apparent to those skilled in the art.

FIG. 5 illustrates a disturbed control and measurement system according to one exemplary embodiment. As illustrated, distributed measurement control system 500 may include one or more computer systems, such as computer systems 510 and 520. The system 500 may also include or more distributed measurement and control devices, such as devices 540, 550, and 560. Note that one of the advantages of the systems and methods for time-based data transfer described above is the ability for the same device, e.g., any of devices 540-560, to be capable of exchanging control, e.g., via an iterative time-based control operation, and measurement data, e.g., via an iterative time-based DAQ operation, simultaneously or concurrently. Thus, each channel on a device, such as any of devices 540-560, may be configured independently based on operation (iterative time-based control (dashed lines) or iterative time-based DAQ (solid lines)), or function. Further, data may be mapped onto one or more TSBs, with or without a data integrity process such as FEC, based on degree of lossless behavior desired. Additionally, the one or more TSBs may be configured to transfer data over isochronous transfer channels at the same or disparate frequencies or rates, such as any of rates r1-r5. Accordingly, all channels may use a common notion of time, e.g., data rate clocks may all be synchronized to a global clock of the network and start times may all be in phase with the global clock, and may transmit data as disparate frequencies, or rates, without compromising determinism.

Further, in certain embodiments, the computer systems 510-520 may be coupled to the distributed measurement and control devices 540-560 via a network switch such as network switch 530. Thus, in some embodiments, computer systems 510-520 and distributed measurement and control devices 540-560 may include a network interface controller (NIC). Note, in certain embodiments, the network switch 530 may include a TS network switch adhering to the IEEE 802.1 standard for real-time data transfer. In other embodiments, the network switch 530 may include an NTS network switch, such as a network switch for PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. In yet other embodiments, it is envisioned that network switch 530 may include a memory controller and the network may be a memory mapped network such as PCI, PCIe, or compactPCI, among others.

An exemplary implementation of the above described systems and methods is illustrated as device 560. Device 560 may include multiple iterative time-based DAQ operations and an iterative time-based control operation and a local buffer may be associated with each operation. Additionally, device 560 includes multiple, e.g., one or more, data rate clocks, a respective data rate clock associated with a respective iterative time-based operation. Device 560 may also include a plurality of functional units, each associated with a respective isochronous channel, e.g., an isochronous data transfer channel, and thus, a respective TSB with a respective rate of transfer r1-r4. Thus, a functional unit, for a respective TSB, may be configured to, for at least one iterative time-based DAQ operation, initiate continuous performance of the at least one time-based iterative data operation of the plurality of iterative time-based DAQ operations at the respective start time, transfer a respective one or more blocks of data to the respective local buffer in response to the continuous performance of the at least one iterative time-based DAQ operation, initiate transfer of a respective one or more blocks of data from a respective local buffer to the respective TSB at a respective start time for transferring the respective one or more blocks of data, and repeat the transferring and initiating transfer one or more times in an iterative manner, thereby transferring the respective one or more blocks of data between the respective local buffer and the respective TSB. Further, the time-based control operation may be associated with a functional unit which may be configured with embodiments of the invention as previously described.

FIG. 6 illustrates a disturbed control and measurement system according to another exemplary embodiment. A system 600 may include a computer system 610 coupled to a TS network 620. Additionally, the system may include TS nodes 630 and 640, also coupled to the TS network 620. Each TS node may include or implement an embodiment of the techniques disclosed herein. TS nodes 630 and 640 may include clock generation circuits which may be synchronized using signals created by time stamp units (TSUs) in network interfaces. The TS nodes may also include a NIC coupled to a TSU, a physical layer (PHY) coupled to a second TSU, as well as an endpoint application, all coupled to the clock generation circuit via a local bus. The TS nodes may each also include a functional unit, a local buffer, and a TSB, all coupled to the local bus. The clock generation circuit may include one or more data rate clocks, each synchronized to a global clock of the TS network 620, via either the TSU of the NIC or the TSU of the PHY. Thus, a start time sent from computer system 610 to each TS node may be used to create coordinated sample events that drive physical acquisition/generation, e.g., to initiate iterative time-based DAQ and control operations. For example, once the functional unit of TS node 630 initiates continuous performance of an iterative time-based DAQ operation and transfers one or more blocks of data to the local buffer, the functional unit may initiate transfer of the one or more blocks of data to TSB and the TSB may communicate the one or more blocks of data over the TS network 620 via an isochronous data transfer channel. In such a manner, data may be transferred between TS nodes 630 and 640 TSBs.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for configuring the mapping of an iterative time-based data acquisition (DAQ) operation to an isochronous data transfer channel of a network, the method comprising:

configuring buffer size of a time-sensitive buffer (TSB) for the iterative time-based DAQ operation, wherein the iterative time-based DAQ operation comprises an associated data transfer per iteration, wherein a block of data comprises data transferred by one or more of the associated data transfers, and wherein the TSB is associated with the isochronous data transfer channel of the network;

configuring a transfer frequency of the TSB;

configuring a data rate clock to synchronize to a global clock of the network;

configuring a start time for transferring one or more blocks of data to the TSB based on the buffer size, a start time of the iterative time-based DAQ operation, a data rate of the iterative time-based DAQ operation in accordance with the data rate clock, and size of a block of the data transferred, wherein the start time of the iterative time-based DAQ operation is in phase with the global clock of the network;

configuring a size of a local buffer based on the size of the block of the data transferred, the transfer frequency of the TSB, and the data rate of the iterative time-based DAQ operation;

configuring the local buffer for transfer of the one or more blocks of data to the local buffer in response to continuous performance of the iterative time-based DAQ operation;

configuring a functional unit to:
  initiate the continuous performance of the iterative time-based DAQ operation at the start time of the iterative time-based DAQ operation;
  transfer the one or more blocks of data to the local buffer in response to the continuous performance of the iterative time-based DAQ operation;
  initiate transfer of the one or more blocks of data between the local buffer and the TSB at the start time for transferring the one or more blocks of data; and
  repeat said transferring and said initiating transfer one or more times in an iterative manner, thereby transferring the one or more blocks of data between the local buffer and the TSB; and configuring the TSB to communicate the one or more blocks of data over the isochronous data transfer channel of the network over at least one cycle at the transfer frequency of the TSB, thereby mapping the iterative time-based DAQ operation to the isochronous data transfer channel of the network.

2. The method of claim 1, further comprising:
configuring the functional unit to perform said configuring buffer size and transfer frequency, said configuring a data rate clock, said configuring a start time for transferring, said configuring a size of a local buffer, and said configuring the local buffer.

3. The method of claim 1, further comprising:
configuring another functional unit to perform said configuring buffer size and transfer frequency, said configuring a data rate clock, said configuring a start time for transferring, said configuring a size of a local buffer, and said configuring the local buffer.

4. The method of claim 1, further comprising:
the functional unit performing:
  initiating continuous performance of the iterative time-based DAQ operation at the start time of the iterative time-based DAQ operation;
  transferring the one or more blocks of data to the local buffer in response to the continuous performance of the iterative time-based DAQ operation;
  initiating transfer of the one or more blocks of data between the local buffer and the TSB at the start time for transferring the one or more blocks of data;
  repeating said transferring and said initiating transfer one or more times in an iterative manner, thereby transferring the one or more blocks of data between the local buffer and the TSB; and
  communicating the one or more blocks of data over the isochronous data transfer channel of the network over at least one cycle at the transfer frequency of the TSB, thereby mapping the iterative time-based DAQ operation to the isochronous data transfer channel of the network.

5. The method of claim 4, wherein said transferring the one or more blocks of data between the local buffer and the TSB comprises:
performing a data integrity process during said transfer thereby preventing data loss.

6. The method of claim 5, wherein the data integrity process comprises:
embedding forward error correction code.

7. The method of claim 1, further comprising:
performing said configuring a data rate clock, said configuring a size of a local buffer, and said configuring a local buffer for each of one or more additional iterative time-based DAQ operations to be initiated at respective start times of the one or more additional iterative time-based DAQ operations, wherein the iterative time-based DAQ operation and the one or more additional iterative time-based DAQ operations compose a plurality of iterative time-based DAQ operations with a corresponding plurality of local buffers.

8. The method of claim 7, further comprising:
configuring the functional unit to:
  for each of the plurality of iterative time-based DAQ operations:
    initiate continuous performance of the iterative time-based DAQ operation at a respective start time of the iterative time-based DAQ operation;
    transfer a respective one or more blocks of data to the respective local buffer in response to the continuous performance of the iterative time-based DAQ operation;
    initiate transfer of the respective one or more blocks of data between the respective local buffer and the TSB at the start time for transferring the one or more blocks of data;
    repeat said transferring and said initiating transfer one or more times in an iterative manner, thereby transferring the one or more blocks of data from the respective local buffer to the TSB; and
  configuring the TSB to communicate the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network.

9. The method of claim 8, further comprising:
the functional unit performing:
  for each of the plurality of iterative time-based DAQ operations:
    initiating continuous performance of the iterative time-based DAQ operation at a respective start time of the iterative time-based DAQ operation;
    transferring a respective one or more blocks of data to the respective local buffer in response to the continuous performance of the iterative time-based DAQ operation;

initiating transfer of the respective one or more blocks of data between the respective local buffer and the TSB at the start time for transferring the one or more blocks of data;

repeating said transferring and said initiating transfer one or more times in an iterative manner, thereby transferring the one or more blocks of data from the respective local buffer to the TSB; and communicating the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network.

10. The method of claim 7, further comprising:

performing said configuring buffer size and transfer frequency, and said configuring a start time for transferring one or more blocks of data, for each of one or more additional TSBs;

wherein each of the one or more additional TSBs is associated with a corresponding functional unit of a one or more additional functional units, wherein the TSB and the additional one or more TSBs compose a plurality of TSBs, wherein the functional unit and the one or more additional functional units compose a plurality of functional units; and wherein the plurality of iterative time-based DAQ operations with the corresponding plurality of local buffers are mapped to the plurality of TSBs, and wherein each of the plurality of TSBs is configured to communicate a respective one or more blocks of data over a corresponding isochronous data transfer channel of the network at a respective transfer frequency of the respective TSB, thereby mapping the plurality of iterative time-based DAQ operations to a plurality of isochronous data transfer channels of the network.

11. The method of claim 10, further comprising:

for each respective TSB of the plurality of TSBs, configuring a corresponding functional unit of the plurality of functional units to:

for at least one iterative time-based DAQ operation of the plurality of iterative time-based DAQ operations:

initiate continuous performance of the at least one iterative time-based DAQ operation at the respective start time of the at least one iterative time-based DAQ operation;

transfer the respective one or more blocks of data to the respective local buffer in response to the continuous performance of the at least one iterative time-based DAQ operation;

initiate transfer of the respective one or more blocks of data between the respective local buffer and the TSB at the start time for transferring the one or more blocks of data;

repeat said transferring and said initiating transfer one or more times in an iterative manner, thereby transferring the respective one or more blocks of data between the respective local buffer and the respective TSB; and configuring each of the plurality of TSBs to communicate the respective one or more blocks of data from each of the plurality of TSBs over a corresponding isochronous data transfer channel of the network at the respective transfer frequency of the respective TSB, thereby mapping the plurality of iterative time-based DAQ operations to a plurality of isochronous data transfer channels of the network.

12. The method of claim 11, further comprising:

for each respective TSB of the plurality of TSBs, a corresponding functional unit of the plurality of functional units performing:

for at least one iterative time-based DAQ operation of the plurality of iterative time-based DAQ operations:

initiating continuous performance of the at least one iterative time-based DAQ operation at the respective start time of the at least one iterative time-based DAQ operation;

transferring the respective one or more blocks of data to the respective local buffer in response to the continuous performance of the at least one iterative time-based DAQ operation;

initiating transfer of the respective one or more blocks of data between the respective local buffer and the TSB at the start time for transferring the one or more blocks of data;

repeating said transferring and said initiating transfer one or more times in an iterative manner, thereby transferring the respective one or more blocks of data between the respective local buffer and the respective TSB; and communicating the respective one or more blocks of data from each of the plurality of TSBs over a corresponding isochronous data transfer channel of the network at the respective transfer frequency of the respective TSB, thereby mapping the plurality of iterative time-based DAQ operations to a plurality of isochronous data transfer channels of the network.

13. The method of claim 1, wherein the functional unit comprises a first functional unit, wherein the local buffer comprises a first local buffer, wherein the TSB comprises a first TSB, wherein the data rate clock comprises a first data rate clock, wherein the isochronous data transfer channel comprises a first isochronous data transfer channel, and wherein the method further comprises:

configuring buffer size of a second TSB for an iterative time-based control operation, wherein the iterative time-based control operation comprises an associated data transfer per iteration, wherein a block of data comprises data transferred by one or more of the associated data transfers, and wherein the second TSB is associated with a second isochronous data transfer channel of the network;

configuring a transfer frequency of the second TSB;

configuring a second data rate clock, associated with the iterative time-based control operation, to synchronize to the global clock of the network;

configuring a second start time for transferring one or more blocks of data from the second TSB based on the buffer size of the second TSB, a start time of the iterative time-based control operation, a data rate of the iterative time-based control operation in accordance with the second data rate clock, and size of a block of the data transferred, wherein the start time of the iterative time-based data operation is in phase with the global clock of the network;

configuring a size of a second local buffer based on the size of the block of the data transferred, the transfer frequency of the second TSB, and the data rate of the iterative time-based control operation;

configuring the second local buffer for transfer of the one or more blocks of data from the second local buffer in response to continuous performance of the time-based control operation;
configuring a second functional unit to:
    initiate the continuous performance of the iterative time-based control operation at the start time of the iterative time-based data operation;
    transfer the one or more blocks of data from the local buffer in response to the continuous performance of the time-based control operation;
    initiate transfer of the one or more blocks of data between the second local buffer and the second TSB at the second start time for transferring the one or more blocks of data; and
    repeat said transferring and said initiating transfer one or more times in an iterative manner, thereby transferring the one or more blocks of data between the second local buffer and the second TSB; and
configuring the second TSB to communicate the one or more blocks of data over a second isochronous data transfer channel of the network over at least one cycle at the transfer frequency of the second TSB, thereby mapping the iterative time-based control operation to the second isochronous data transfer channel of the network.

14. The method of claim 13, wherein the functional unit further comprises the second functional unit, the TSB further comprises the second TSB, wherein the transfer frequency of the second TSB equals the transfer frequency of the first TSB, and wherein the isochronous data transfer channel further comprises the second isochronous channel, thereby mapping the iterative time-based DAQ operation and the iterative time-based control operation to the isochronous data transfer channel of the network.

15. The method of claim 1, wherein the network comprises:
    a time-sensitive network;
    an Ethernet network; or
    a memory-mapped bus.

16. A system for mapping an iterative time-based DAQ operation to an isochronous data transfer channel of a network, the system comprising:
    a functional unit;
    a data rate clock, coupled to the functional unit, wherein the data rate clock is configured to synchronize to a global clock of the network;
    a local buffer, coupled to the functional unit; and
    a time-sensitive buffer (TSB), coupled to the functional unit, wherein the TSB comprises a configurable buffer size for the iterative time-based DAQ operation and a configurable transfer frequency;
    wherein the iterative time-based DAQ operation comprises an associated data transfer per iteration, wherein a block of data comprises data transferred by one or more of the associated data transfers, and wherein the TSB is associated with the isochronous data transfer channel of the network;
    wherein a start time for transferring one or more blocks of data to the TSB is configured based on the buffer size, a start time of the iterative time-based DAQ operation, a data rate of the iterative time-based DAQ operation in accordance with the data rate clock, and size of a block of the data to be transferred, wherein the start time of the iterative time-based DAQ operation is in phase with the global clock of the network;
    wherein a size of the local buffer is configured based on the size of the block of the data transferred, the transfer frequency of the TSB, and the data rate of the iterative time-based DAQ operation;
    wherein the local buffer is configured for transfer of the one or more blocks of data to the local buffer in response to continuous performance of the iterative time-based DAQ operation;
    wherein the functional unit is configured to:
        initiate the continuous performance of the iterative time-based DAQ operation at the start time of the iterative time-based DAQ operation;
        transfer the one or more blocks of data to the local buffer in response to the continuous performance of the iterative time-based DAQ operation;
        initiate transfer of the one or more blocks of data between the local buffer and the TSB at the start time for transferring the one or more blocks of data; and
        repeat said transferring and said initiating transfer one or more times in an iterative manner, thereby transferring the one or more blocks of data between the local buffer and the TSB; and
    wherein the TSB is configured to communicate the one or more blocks of data over the isochronous data transfer channel of the network over at least one cycle at the transfer frequency of the TSB, thereby mapping the iterative time-based DAQ operation to the isochronous data transfer channel of the network.

17. The system of claim 16, wherein to transfer the one or more blocks of data between the local buffer and the TSB, the functional unit is further configured to:
    perform a data integrity process during said transfer thereby preventing data loss.

18. The system of claim 17, wherein the data integrity process comprises:
    embedding forward error correction code.

19. The system of claim 16, wherein to map one or more additional iterative time-based DAQ operations, the system further comprises:
    one or more additional data rate clocks, coupled to the functional unit, wherein each of the one or more additional data rate clocks are configured to synchronize to the global clock of the network; and
    one or more additional local buffers, configured with a respective size and coupled to the functional unit; and
    wherein the iterative time-based DAQ operation and the one or more additional iterative time-based DAQ operations compose a plurality of iterative time-based DAQ operations with a corresponding plurality of local buffers, wherein the local buffer and the one or more additional local buffers compose the corresponding plurality of local buffers.

20. The system of claim 19,
wherein the functional unit is further configured to:
    for each of the plurality of iterative time-based DAQ operations:
        initiate continuous performance of the iterative time-based DAQ operation at the respective start time of the iterative time-based DAQ operation;
        transfer a respective one or more blocks of data to the respective local buffer in response to the continuous performance of the iterative time-based DAQ operation;
        initiate transfer of the respective one or more blocks of data between the respective local buffer and the TSB at the start time for transferring the one or more blocks of data;

repeat said transferring and said initiating transfer one or more times in an iterative manner, thereby transferring the one or more blocks of data between the respective local buffer and the TSB; and wherein the TSB is configured to communicate the respective one or more blocks of data for each iterative time-based DAQ operation over the isochronous data transfer channel of the network over at least one cycle at the transfer frequency of the TSB, thereby mapping the plurality of iterative time-based DAQ operations to the isochronous data transfer channel of the network.

21. The system of claim 19, further comprising:

one or more additional functional units, wherein the functional unit and the one or more additional functional units compose a plurality of functional units;

one or more additional TSBs, wherein the TSB and the one or more additional TSBs compose a plurality of TSBs, wherein each respective TSB corresponds to a respective functional unit, wherein each TSB of the plurality of TSBs comprises a respective configurable buffer size and transfer frequency;

wherein, for a respective TSB, a respective functional unit is configured to:

for at least one iterative time-based DAQ operation of the plurality of time based data operations:

initiate continuous performance of the at least one time-based iterative data operation of the plurality of iterative time-based DAQ operations at the respective start time;

transfer a respective one or more blocks of data to the respective local buffer in response to the continuous performance of the at least one iterative time-based DAQ operation;

initiate transfer of a respective one or more blocks of data from a respective local buffer to the respective TSB at a respective start time for transferring the respective one or more blocks of data; and repeat said transferring and said initiating transfer one or more times in an iterative manner, thereby transferring the respective one or more blocks of data between the respective local buffer and the respective TSB; and wherein each respective TSB of the plurality of TSBs is configured to communicate respective one or more blocks of data over a corresponding isochronous data transfer channel of the network at the respective transfer frequency of the respective TSB, thereby mapping the plurality of iterative time-based DAQ operations to a plurality of isochronous data transfer channels of the network.

22. The system of claim 16, wherein the functional unit comprises a first functional unit, wherein the local buffer comprises a first local buffer, wherein the TSB comprises a first TSB, wherein the data rate clock comprises a first data rate clock, wherein the isochronous data transfer channel comprises a first isochronous data transfer channel, and wherein the system further comprises:

a second TSB, coupled to a second functional unit, wherein the second TSB comprises a configurable buffer size for an iterative time-based control operation and a configurable transfer frequency;

wherein the iterative time-based control operation comprises an associated data transfer per iteration, wherein a block of data comprises data transferred by one or more of the associated data transfers, and wherein the second TSB is associated with the second isochronous data transfer channel of the network;

wherein a second data rate clock, associated with the iterative time-based control operation, is configured to synchronize to the global clock of the network;

wherein a second start time for transferring one or more blocks of data from the second TSB is configured based on the buffer size of the second TSB, a start time of the iterative time-based control operation, a data rate of the iterative time-based control operation in accordance with the second data rate clock, and size of a block of the data transferred, wherein the start time of the iterative time-based data operation is in phase with the global clock of the network;

wherein a size of a second local buffer is configured based on the size of the block of the data transferred, the transfer frequency of the second TSB, and the data rate of the iterative time-based control operation;

wherein the second local buffer is configured for transfer of the one or more blocks of data from the second local buffer in response to continuous performance of the time-based control operation;

configuring the second functional unit to:

initiate the continuous performance of the iterative time-based control operation at the start time of the iterative time-based data operation;

transfer the one or more blocks of data from the local buffer in response to the continuous performance of the time-based control operation;

initiate transfer of the one or more blocks of data between the second local buffer and the second TSB at the second start time for transferring the one or more blocks of data; and repeat said transferring and said initiating transfer one or more times in an iterative manner, thereby transferring the one or more blocks of data between the second local buffer and the second TSB; and wherein the second TSB is configured to communicate the one or more blocks of data over a second isochronous data transfer channel of the network over at least one cycle at the transfer frequency of the second TSB, thereby mapping the iterative time-based control operation to the second isochronous data transfer channel of the network.

23. The system of claim 22, wherein the functional unit further comprises the second functional unit, wherein the TSB further comprises the second TSB, wherein the transfer frequency of the second TSB equals the transfer frequency of the first TSB, and wherein the isochronous data transfer channel further comprises the second isochronous channel, thereby mapping the iterative time-based DAQ operation and the iterative time-based control operation to the isochronous data transfer channel of the network.

24. The system of claim 17, wherein the network comprises:

a time-sensitive network;
an Ethernet network; or
a memory-mapped bus.

* * * * *